(12) United States Patent
Huang

(10) Patent No.: US 12,058,379 B2
(45) Date of Patent: Aug. 6, 2024

(54) POINT CLOUD DATA PROCESSING

(71) Applicant: ZTE Corporation, Guangdong (CN)

(72) Inventor: Cheng Huang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 124 days.

(21) Appl. No.: 17/858,750

(22) Filed: Jul. 6, 2022

(65) Prior Publication Data

US 2022/0353539 A1 Nov. 3, 2022

Related U.S. Application Data

(63) Continuation of application No. PCT/CN2020/070854, filed on Jan. 8, 2020.

(51) Int. Cl.
| | | |
|---|---|---|
| H04N 19/70 | (2014.01) | |
| H04N 19/597 | (2014.01) | |
| H04N 21/854 | (2011.01) | |

(52) U.S. Cl.
CPC ........... *H04N 19/70* (2014.11); *H04N 19/597* (2014.11); *H04N 21/85406* (2013.01)

(58) Field of Classification Search
CPC . H04N 19/70; H04N 19/597; H04N 21/85406
See application file for complete search history.

(56) References Cited

U.S. PATENT DOCUMENTS

| | | |
|---|---|---|
| 10,991,066 B2 | 4/2021 | Lee et al. |
| 11,363,086 B2 | 6/2022 | Champel et al. |

| | | |
|---|---|---|
| 2019/0104316 A1 | 4/2019 | Da Silva Pratas Gabriel et al. |
| 2019/0379856 A1 | 12/2019 | Hur et al. |
| 2021/0327100 A1 | 10/2021 | Sugio et al. |
| 2022/0166814 A1 | 5/2022 | Hamza et al. |

FOREIGN PATENT DOCUMENTS

| | | |
|---|---|---|
| CN | 107438203 A | 12/2017 |
| CN | 109313820 A | 2/2019 |
| CN | 109691094 A | 4/2019 |
| CN | 110533645 A | 12/2019 |
| JP | 2022-524130 A | 4/2022 |
| WO | 2019076506 A1 | 4/2019 |
| WO | 2019158821 A1 | 8/2019 |
| WO | 2019195547 A1 | 10/2019 |

OTHER PUBLICATIONS

Japanese office action issued in JP Patent Application No. 2022-542002, dated Oct. 3, 2023, 3 pages. English translation included.

(Continued)

*Primary Examiner* — On S Mung
(74) *Attorney, Agent, or Firm* — Perkins Coie LLP

(57) ABSTRACT

Techniques are described to perform point cloud data processing. An example method of point cloud data processing includes determining one or more spatial region descriptors that describe one or more three-dimensional (3D) spatial regions of a point cloud data and one or more preselection elements that describe point cloud components associated with the point cloud data, and transmitting a media presentation description (MPD) file that includes the one or more spatial region descriptors and the one or more preselection elements.

20 Claims, 6 Drawing Sheets

(56) References Cited

OTHER PUBLICATIONS

Chinese office action issued in CN Patent Application No. 202080081600.9, dated Mar. 24, 2023, 14 pages. English translation included.
Chinese notice of allowance issued in CN Patent Application No. 202080081600.9, dated Sep. 13, 2023, 4 pages. English translation included.
European Search Report for EP Patent Application No. 20886439.7, dated Dec. 12, 2022 (9 pages).
Aksu, "Technologies Under Consideration for Carriage of Point Cloud Data," ISO/IEC JTC 1/SC 29/WG 11, MPEG2018/N18414, Geneva, Switzerland, Mar. 2019, 40 pages.
Wang et al., "Signaling of V-PCC and 3D Video Tracks and their Spatial Relationship in MPEG-DASH," ISO/IEC JTC1/SC29/WG11 MPEG2016/M50982, Oct. 2019, Geneva, Switzerland, 15 pages.
"Revised Text of ISO/IEC CD 23090-10 Carriage of Video-based Point Cloud Coding Data," ISO/IEC JTC 1/SC 29/WG 11, N18606, Geneva, Switzerland, 41 pages.
Aksu, "Technologies Under Consideration for Carriage of V-PCC Data," ISO/IEC JTC1/SC29/WG11 MPEG2018/N18833, Geneva, Switzerland, Oct. 2019, 72 pages.
Korean office action issued in KR Patent Application No. 10-2022-7026934, dated Mar. 15, 2024, 9 pages. English translation included.
Japanese notice of allowance issued in JP Patent Application No. 2022-542002, dated Nov. 28, 2023, 3 pages. English translation included.
Indian Hearing Notice issued in IN Patent Application No. 202247039804, dated Feb. 9, 2024, 3 pages. English translation included.
International Search Report and Written Opinion for International Application No. PCT/CN2020/070854, mailed on Oct. 12, 2020 (7 pages).

POINT CLOUD DATA PROCESSING

CROSS-REFERENCE TO RELATED APPLICATIONS

This application is a continuation of International Patent Application No. PCT/CN2020/070854, filed on Jan. 8, 2020, the contents of which are incorporated herein by reference in their entirety.

TECHNICAL FIELD

This patent document is directed the multimedia data processing and transmission technologies and/or to a point cloud data processing and transmission method, apparatus and system.

BACKGROUND

Video encoding uses compression tools to encode two-dimensional video frames into a compressed bitstream representation that is more efficient for storing or transporting over a network. Traditional video coding techniques that use two-dimensional video frames for encoding sometimes are inefficient for representation of visual information of a three-dimensional visual scene.

SUMMARY

This patent document describes, among other things, techniques for encoding and decoding digital video that carries visual information related to multi-dimensional point cloud data.

A method of point cloud data processing comprises determining one or more spatial region descriptors that describe one or more three-dimensional (3D) spatial regions of a point cloud data and one or more preselection elements that describe point cloud components associated with the point cloud data, and transmitting a media presentation description (MPD) file that includes the one or more spatial region descriptors and the one or more preselection elements.

Another method of point cloud data processing comprises receiving a media presentation description (MPD) file that includes one or more spatial region descriptors that describe one or more three-dimensional (3D) spatial regions of a point cloud data and one or more preselection elements that describe point cloud components associated with the point cloud data, and accessing, with a preselection of one or more preselection elements, the point cloud components corresponding to the one or more 3D spatial regions of the point cloud data.

In yet another exemplary aspect, the above-described methods and the methods described in this patent document are embodied in the form of processor-executable code and stored in a non-transitory computer-readable storage medium. The code included in the computer readable storage medium when executed by a processor, causes the processor to implement the methods described in this patent document.

Another exemplary embodiment discloses a device that is configured or operable to perform the above-described methods and the methods described in this patent document.

The above and other aspects and their implementations are described in greater detail in the drawings, the descriptions, and the claims.

DETAILED DESCRIPTION

Figure 1:
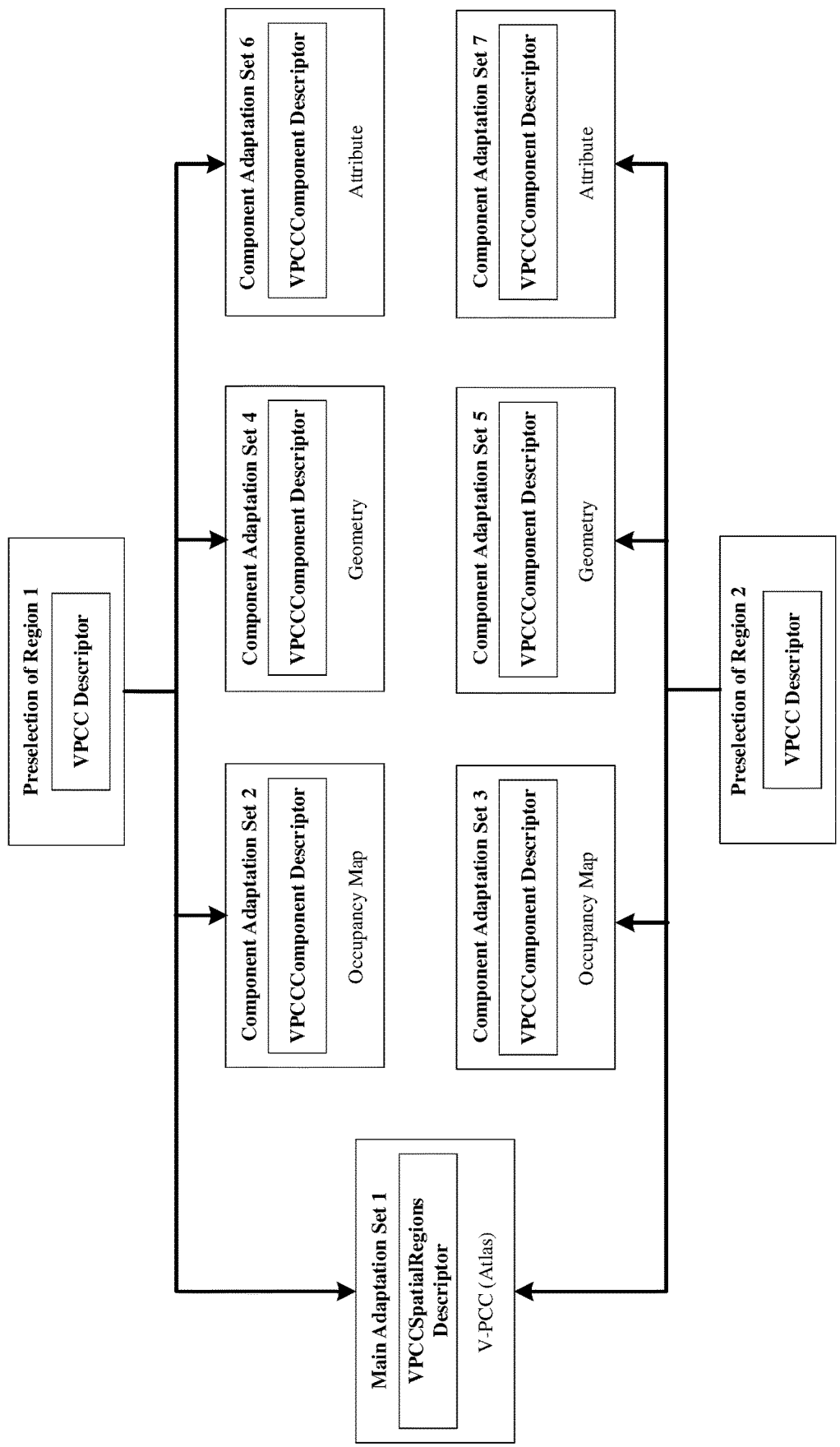
FIG. 1 illustrates an exemplary MPEG-DASH configuration for grouping Video-based point cloud compression (V-PCC) components belonging to a 3D spatial region of a point cloud content using component adaptation sets.

Video-based point cloud compression (V-PCC) represents a volumetric encoding of point cloud visual information and enables efficient capturing, compression, reconstruction, and rendering of point cloud data by utilizing MPEG video codecs, such as AVC, HEVC and VVC. A V-PCC bitstream, containing coded point cloud sequence (CPCS), is composed of VPCC units carrying sequence parameter set (SPS) data, an atlas information bitstream, a 2D video encoded occupancy map bitstream, a 2D video encoded geometry bitstream, and zero or more 2D video encoded attribute bitstreams. Each V-PCC unit has a V-PCC unit header, which describes the type of the V-PCC unit, and a V-PCC unit payload. The payload of occupancy, geometry, and attribute V-PCC units correspond to video data units (e.g., HEVC NAL units) that could be decoded by the video decoder specified in the corresponding occupancy, geometry, and attribute parameter set V-PCC unit.

This patent document describes techniques for grouping V-PCC components belonging to the 3D spatial region of a point cloud content as further described in Embodiment 2 to 5 for usage of spatial region descriptor and related preselection mechanisms. As further described in this patent document, the described techniques can be used to facilitate partial access and delivery of point cloud data.

I. Example Structure of V-PCC International Organization for Standardization Base Media File Format (ISOBMFF) Container V-PCC units in a V-PCC elementary stream are mapped to individual tracks within the ISOBMFF file based on their types. There are two types of tracks in a multi-track ISOBMFF V-PCC container: V-PCC track and V-PCC component track.

The V-PCC track is a track carrying the volumetric visual information in the V-PCC bitstream, which includes the patch information sub-bitstream and the sequence parameter sets. V-PCC component tracks are restricted video scheme tracks which carry 2D video encoded data for the occupancy map, geometry, and attribute sub-bitstreams of the V-PCC bitstream. Based on this layout, a V-PCC ISOBMFF container can include the following:

A V-PCC track which contains sequence parameter sets (in the sample entry) and samples carrying the payloads of the sequence parameter set V-PCC unit (unit type VPCC_VPS) and atlas V-PCC units (unit type VPCC_AD). This track also includes track references to other tracks carrying the payloads of video compressed V-PCC units (e.g., unit types VPCC_OVD, VPCC_GVD, and VPCC_AVD).

A restricted video scheme track where the samples contain access units of a video-coded elementary stream for occupancy map data (e.g., payloads of V-PCC units of type VPCC_OVD).

One or more restricted video scheme tracks where the samples contain access units of video-coded elementary streams for geometry data (e.g., payloads of V-PCC units of type VPCC_GVD).

Zero or more restricted video scheme tracks where the samples contain access units of video-coded elementary streams for attribute data (e.g., payloads of V-PCC units of type VPCC_AVD).

II. Encapsulation and Signaling in MPEG-DASH

Volumetric visual media such as point cloud data is gaining traction to provide six degrees of freedom (6-DoF) immersive media experiences. Adaptive streaming based content distribution technologies such as MPEG DASH needs to support point cloud data transmission.

Unlike traditional media content, point cloud data specified as V-PCC media content are composed of a number of different V-PCC components including atlas data, occupancy map, geometry, or attribute of a particular type that is associated with a V-PCC point cloud representation. V-PCC components of geometry and attribute may have multiple layers. Each V-PCC component (and/or layer) is separately encoded as a sub-stream of the V-PCC bitstream. V-PCC component sub-streams of geometry, occupancy map and attributes, are encoded using conventional video encoders (e.g., H.264/AVC or H.265/HEVC). However, these sub-streams need to be collectively decoded along with the patch data of atlas sub-stream in order to reconstruct and render the point cloud data.

III. Partial Access and Delivery of Point Cloud Data

Users typically have 6-DoF to view the point cloud object. At any given point in time, only some portion of the available point cloud object will be visible to the user depending on the user's location, viewport, field of view, etc. Therefore, for many applications entire point cloud data does not have to be delivered, decoded and rendered at the same time.

To enable spatial access to specific regions within the 3D space, the bounding box for the point cloud object may be divided into a number of 3D spatial regions. The points belonging to the same parts of the point cloud object may be grouped together and represented by the respective 3D spatial region. Patches resulting from the projection of points within each of the resulting 3D spatial regions are packed together in the 2D frames of the V-PCC track. A 3D spatial region within the bounding box of the point cloud may be associated with one or more V-PCC component track groups.

In order to support the partial access and delivery of the point cloud object, there is a need to identify one or more 3D spatial sub-regions to fully cover the user's 6-DoF viewport and one or more associated V-PCC component track groups.

IV. Brief Discussion

Section headings are used in the present document only to improve readability and do not limit scope of the disclosed embodiments and techniques in each section to only that section. Certain features are described using the example of the H.264/AVC and H.265/HEVC and MPEG standards. However, applicability of the disclosed techniques is not limited to only H.264/AVC or H.265/HEVC systems.

In the present document, various syntax elements are disclosed in different sections for point cloud data processing. However, it is understood that a syntax element with same name will have a same format and syntax as used in different sections, unless otherwise noted. Furthermore, the different syntax elements and structures described under different section headings may be combined together in various embodiments. In addition, while the specific structures are described as implementation examples, it will be understood that the order of various entries of syntax structures may be changed, unless otherwise noted in the present document.

In general, embodiments based on the disclosed technique may be used for video data processing. In some embodiments, omnidirectional video data is stored in a file based on an International Organization for Standardization (ISO) basic media file format. Among them, the ISO basic media file format such as the restricted scheme information box, the track reference box, and the track group box can refer to the ISO/IEC JTC1/SC29/WG11 Moving Picture Experts Group (MPEG) MPEG-4. Part 12 ISO Base Media File Format to operate.

All the data in the ISO basic file format is installed in a box. The ISO basic file format represented by an MPEG 4 (MP4) file is composed of several boxes, each of which has a type and a length and can be regarded as a data object. A box can contain another box called a container box. An MP4 file will first have only one "ftyp" type of box, as a markup of the file format and contain some information about the file. There will be and only one "MOOV" type of box (Movie Box), which is a container box whose subbox contains metadata information for the media. The media data of the MP4 file is included in the "mdat" type of media box (Media Data Box), which is also a container box, which may or may not be available (when the media data refers to other files), the structure of the media data is composed of metadata.

A timed metadata track is a mechanism in the ISO Base Media File Format (ISOBMFF) that establishes timed metadata associated with a particular sample. Timed metadata is less coupled to media data and is usually "descriptive."

In the present document, several technical solutions are provided to allow representation of a 3D or spatial region of a point cloud data, such as the V-PCC data of MPEG, into a format that is compatible with the traditional 2D video formats such as the MP4 or the ISOBMFF format. One advantageous aspect of the proposed solutions is to be able to reuse traditional 2D video techniques and syntax for implementation of the new functionality.

V. Embodiment 1: Carriage of Video-Based Point Cloud Data

V. (a). Spatial Region Information Structure

In some embodiments, the spatial region information of a point cloud data includes, or is described using, any one or more of the following: SpatialRegionInfoStruct( ) and BoundingBoxInfoStruct( ) provide spatial region information of a point cloud data, including the x, y, z coordinate offset and the width, height, and depth of the 3D spatial region, and its source bounding box.

Syntax Example

```
aligned(8) SpatialRegionInfoStruct( ) {
    unsigned int(16) region_id;
    unsigned int(16) reference_x;
    unsigned int(16) reference_y;
    unsigned int(16) reference_z;
    unsigned int(1)  delta_included_flag;
    if (delta_included_flag) {
        unsigned int(16) delta_x;
        unsigned int(16) delta_y;
        unsigned int(16) delta_z;
    }
    else {
        unsigned int(16) width;
        unsigned int(16) height;
        unsigned int(16) depth;
    }
    unsigned int(1)  3d_bounding_box_present_flag;
    if(3d_bounding_box_present_flag){
        BoundingBoxStruct( );
    }
}
aligned(8) class BoundingBoxStruct( ) {
    unsigned int(16) bounding_box_x;
    unsigned int(16) bounding_box_y;
    unsigned int(16) bounding_box_z;
}
```

Semantics Example region_id specify the identity of a 3D spatial region of a point cloud data.

reference_x, reference_y and reference_z specify the x, y, and z coordinate values, respectively, of the spatial region corresponding to the 3D spatial part of point cloud data in the Cartesian coordinates.

delta_included_flag indicates whether delta_x, delta_y, and delta_z are used to specify spatial region in the SpatialRegionInfoStruct( ).

delta_x, delta_y and delta_z specify the dimensions of the 3D spatial region in the Cartesian coordinates along the x, y, and z axes, respectively width, height, and depth indicate the width, height, and depth of the 3D spatial region in the Cartesian coordinates along the x, y, and z axes, respectively.

3d_bounding_box_present_flag indicates whether a 3D bounding box parameters of a point cloud data is present.

bounding_box_x, bounding_box_y and bounding_box_z specify the extension of the 3D bounding box of point cloud data in the Cartesian coordinates along the x, y, and z axes, respectively, relative to the origin (0,0,0).

V. (b). Video-Encoded V-PCC Component Tracks

Since it may not be meaningful to display the decoded frames from attribute, geometry, or occupancy map tracks without reconstructing the point cloud at the player side, a restricted video scheme type may be defined for these video-coded tracks. For example, V-PCC component video tracks may be represented in the file as restricted video and identified by 'pccv' in the scheme_type field of the SchemeTypeBox of the RestrictedSchemeInfoBox of their restricted video sample entries. There should be a SchemeInformationBox in the V-PCC component video track which includes a VPCCUnitHeaderBox.

V-PCC component video tracks may include at least: a 2D video encoded occupancy map track, a 2D video encoded geometry track, and zero or more 2D video encoded attribute tracks. All the V-PCC component tracks (occupancy map track, geometry track and attribute tracks) corresponding to the same spatial region of point cloud data may be grouped together using the track grouping tool of ISO/IEC 14496-12 by adding a specific type of VPCCTrackGroupBox('pctg') to all component tracks. An example VPCCTrackGroupBox in the V-PCC component video tracks is described below in conjunction with an optional implementation.

VPCCTrackGroupBox
Box Type: 'pctg'
Container: TrackBox
Mandatory: No
Quantity: Zero or one TrackGroupTypeBox with track_group_type equal to 'pctg' is VPCCTrackGroupBox which indicates a V-PCC component track group.

V-PCC component tracks that have the same value of track_group_id within TrackGroupTypeBox with track_group_type equal to 'pctg' belong to the same track group with 3D spatial relationships (e.g. corresponding to the same 3D region of the point cloud data). The track_group_id within TrackGroupTypeBox with track_group_type equal to 'pctg' could be used as the identifier of the spatial region of point cloud data.

V-PCC component tracks corresponding to the same spatial region have the same value of track_group_id for track_group_type 'pctg', and the track_group_id of tracks from one spatial region differs from the track_group_id of tracks from any other spatial region.

Syntax Example

```
aligned(8) class VPCCTrackGroupBox extends
    TrackGroupTypeBox('pctg') {
    SpatialRegionInfoStruct( );
}
```

The V-PCC component video track may include a TrackGroupTypeBox with track_group_type equal to 'pctg', that is, a VPCCTrackGroupBox.

In some embodiments, the spatial region information of a point cloud data includes, or is described using, a format that is similar to the format previously described (see, paragraph [0035] et seq.).

V. (c). V-PCC Tracks

Unlike video tracks that store traditional planar 2D video information, the V-PCC track is a new type of track for storing 3D volumetric visual information.

The following describes a V-PCC track sample entry:
Sample Entry Type: 'vpc 1', 'vpcg'
Container: SampleDescriptionBox ('stsd')
Mandatory: A 'vpc1' or 'vpcg' sample entry is mandatory
Quantity: One or more sample entries may be present V-PCC tracks should use VPCCSampleEntry which extends VolumetricVisualSampleEntry with a sample entry type of 'vpc1' or 'vpcg'.

A VPCC volumetric sample entry should contain a VPCCConfigurationBox which includes a VPCCDecoderConfigurationRecord, as described herein.

```
aligned(8) class VPCCDecoderConfigurationRecord {
    unsigned int(8) configurationVersion = 1;
    sample_stream_vpcc_header header;
    unsigned int(8) numOfSetupUnits;
    for (i=0; i<numOfSetupUnits; i++) {
        sample_stream_vpcc_unit setupUnit;
    }
}
class VPCCConfigurationBox extends Box('vpcc') {
    VPCCDecoderConfigurationRecord( ) VPCCConfig;
}
```

Syntax Example

```
aligned(8) class VPCCSampleEntry( ) extends VolumetricVisualSampleEntry ('vpc1') {
    VPCCConfigurationBox    config;
    VPCCUnitHeaderHeaderBox unit;
    VPCCSpatialRegionBox ( );
}
aligned(8) class VPCCSpatialRegionBox extends FullBox('vpsr',0,0) {
    unsigned int(16) num_regions;
    for (i = 0; i < num_regions; i++) {
        SpatialRegionInfoStruct( );
        unsigned int(4)   mapping_type[i];
        if(mapping_type[i] == 0) {
            unsigned int(8)   num_patches[i];
        if(mapping_type[i] == 1) {
            unsigned int(8) num_tiles[i];
            for (j=0; j<num_tiles[i]; j++) {
                unsigned int(32) tile_track_group_id[i][j];
        if(mapping_type[i] == 2) {
            unsigned int(8) num_tile_groups[i];
            for (j=0; j<num_tile_groups[i]; j++) {
                unsigned int(16) tile_group_id[i][j];
            }
        if(mapping_type[i] == 3) {
            unsigned int(8) num_track_groups[i];
            for (j=0; j<num_track_groups[i]; j++) {
                unsigned int(16) track_group_id[i][j];
            }
        }
    }
}
```

Semantics Example num_regions specify the number of 3D regions of a point cloud data.

mapping_type[i] specify the mapping type of region[i] of a point cloud data.

num_patches[i] specify number of patches in region[i] of a point cloud data.

num_tiles[i] specify number of 2D tiles in region[i] of a point cloud data.

tile_track_group_id[i][j] specify the array of 2D tile track group identity of region[i] of a point cloud data.

num_tile_groups[i] specify number of tile group in region[i] of a point cloud data.

tile_group_id[i][j] specify the array of tile group identity of region[i] of a point cloud data.

num_track_groups[i] specify the number of V-PCC component track groups in region[i] of a point cloud data.

track_group_id[i][j] specify the array of V-PCC component track group identity of region[i] of a point cloud data.

V. (d). V-PCC Timed Metadata Track

The V-PCC spatial region timed metadata track is linked to the respective V-PCC track by utilizing the TrackReferenceBox of the 'cdsc' track reference type, indicating the corresponding spatial region information of a point cloud data that changes dynamically over time.

The sample entry of V-PCC timed metadata track and its sample format may be described as follows:

A 3D region of a point cloud data is associated with one or more 2D regions of a point cloud track patch frame which may contain patch data, 2D tile data or tile group data for reconstructing the 3D region of the point cloud data, using a VolumetricTileInfoBox( ) which is described as follows.

Syntax Example

```
class VPCCSpatialRegionSampleEntry extends
MetaDataSampleEntry('pcsr') {
    VPCCSpatialRegionsBox( );
}
```

Sample Format

The sample syntax of this sample entry type 'pcsr' is specified as follows:

```
aligned(8) VPCCSpatialRegionSample( ) {
    VPCCSpatialRegionsBox( );
}
```

VI. Embodiment 2: Encapsulation and Signaling in MPEG-DASH

VI. (a). Single-Track DASH Mode

The single-track mode in DASH enables streaming of V-PCC ISOBMFF files where different video encoded components are stored as a single-track. The single-track mode in DASH should be represented as one AdaptationSet with one or more Representations. Representations within the sole AdaptationSet shall use the same codec for the corresponding video encoded components but are not required to use the same codec for every video component.

VI. (b). Multi-Track Mode

Each V-PCC component may be represented in the MPEG-DASH manifest or MPEG-Dash Media Presentation Description (MPD) file as a separate AdaptationSet. An additional AdaptationSet for atlas information serves as the main AdaptationSet for the V-PCC content. If a V-PCC component has multiple layers, each layer may be signaled using a separate AdaptationSet.

The main AdaptationSet may have the @codecs attribute set to 'vpc1' while the @codecs attribute for the V-PCC components AdaptationSets, or Representations if @codecs is not signaled for the AdaptationSet element, is set based on the respective codec used for encoding the component.

The main AdaptationSet may contain a single initialization segment at the adaptation set level. The initialization segment may contain all sequence parameter sets needed to initialize the V-PCC decoder, including V-PCC sequence parameter sets as well as other parameter sets for component sub-streams.

Media segments for the Representation of the main AdaptationSet may contain one or more track fragments of the V-PCC track. Media segments for the Representations of component AdaptationSets may contain one or more track fragments of the corresponding component track at the file format level.

VI. (c). V-PCC Pre-Selections

A V-PCC preselection is signaled in the MPD using a PreSelection element as defined in MPEG-DASH (ISO/IEC 23009-1) with an identifier (ID) list for the @preselectionComponents attribute including the ID of the main AdaptationSet for the point cloud followed by the IDs of the AdaptationSets corresponding to the point cloud components. The @codecs attribute for the PreSelection may be set to 'vpc1', indicating that the PreSelection media is a video-based point cloud. The PreSelection may either be signaled using a PreSelection element within the Period element or a preselection descriptor at the adaptation set level.

VI. (d). VPCCSpatialRegion Descriptor

To identify the static 3D spatial regions of the point cloud and their associated V-PCC component track groups, a VPCCSpatialRegion descriptor shall be used. A VPCCSpatialRegion is a SupplementalProperty descriptor with the @schemeIdUri attribute equal to "urn:mpeg:mpegI.vpcc:2019:vpsr".

At most one VPCCSpatialRegion descriptor may be present at the adaptation set level in the main AdaptationSet of the point cloud for the multi-track mode, or in the AdaptationSet of the point cloud for the single-track mode.

V-PCC components AdaptationSets corresponding to the same 3D spatial regions of the point cloud shall use the same codec (e.g., the occupancy map shall have the same codec in all components AdaptationSets) but are not required to use the same codec for every point cloud component (e.g., the occupancy map could use one codec, AVC, and geometry could be encoded by second codec, HEVC).

The @value attribute of the VPCCSpatialRegion descriptor may not be present. The VPCCSpatialRegion descriptor may include elements and attributes as specified in Table 1.

TABLE 1

Elements and attributes for the VPCCSpatialRegion descriptor

| Elements and attributes for VPCCSpatialRegion descriptor | Use | Data type | Description |
| --- | --- | --- | --- |
| spatialRegion | 0 . . . N | vpcc:spatialRegionType | An element whose attributes specify information of spatial region for the point cloud and its associated V-PCC component track groups. |
| spatialRegion@regionId | M | xs:unsignedByte | This attribute specifies the identifier for the spatial region of the point cloud. |
| spatialRegion@reference_x | M | xs:int | The x-coordinate value of the reference point for the 3D spatial region of point cloud data in the Cartesian coordinates. |
| spatialRegion@reference_y | M | xs:int | The y-coordinate value of the reference point for the 3D spatial region of point cloud data in the Cartesian coordinates. |
| spatialRegion@reference_z | M | xs:int | The z-coordinate value of the reference point for the 3D spatial region of point cloud data in the Cartesian coordinates. |
| spatialRegion@delta_x | M | xs:int | The dimension of the 3D spatial region along the x axe in the Cartesian coordinates. |
| spatialRegion@delta_y | M | xs:int | The dimension of the 3D spatial region along the y axe in the Cartesian coordinates. |
| spatialRegion@delta_z | M | xs:int | The dimension of the 3D spatial region along the z axe in the Cartesian coordinates. |
| spatialRegion@bounding_box_x | O | xs:int | The extension of the 3D bounding box of point cloud data in the Cartesian coordinates along the x axe, relative to the origin (0, 0, 0). |
| spatialRegion@bounding_box_y | O | xs:int | The extension of the 3D bounding box of point cloud data in the Cartesian coordinates along the y axe, relative to the origin (0, 0, 0). |

TABLE 1-continued

Elements and attributes for the VPCCSpatialRegion descriptor

| Elements and attributes for VPCCSpatialRegion descriptor | Use | Data type | Description |
|---|---|---|---|
| spatialRegion@bounding_box_z | O | xs:int | The extension of the 3D bounding box of point cloud data in the Cartesian coordinates along the z axe, relative to the origin (0, 0, 0). |
| spatialRegion@trackGroupIds | O | xs:StringVectorType | A list of space separated identifiers corresponding to the values of the track_group_id for a number of V-PCC component track groups. This attribute may be absent if V-PCC components are stored as a single-track. |

Legend:
For attributes: M = Mandatory, O = Optional, OD = Optional with Default Value, CM = Conditionally Mandatory.
For elements: <minOccurs> ... <maxOccurs> (N = unbounded)
Elements are bold; attributes are non-bold and preceded with an @.

VI. (e). V-PCC Descriptor

An EssentialProperty element with a @ schemeIdUri attribute equal to "urn:mpeg:mpegI:vpcc:2019:vpc" is referred to as a VPCC descriptor. At most one VPCC descriptor may be present at the adaptation set level for the main AdaptationSet of the point cloud.

TABLE 2

Attributes for the VPCC descriptor

| Attributes for VPCC descriptor | Use | Data type | Description |
|---|---|---|---|
| vpcc:@pcId | CM | xs:string | An id for the point cloud. This attribute shall be present if multiple versions of the same point cloud are signalled in separate AdaptationSets. |
| vpcc:@regionIds | CM | xs:stringVectorType | A list of space separated identifiers for the spatial region of the point cloud. This attribute shall be present if the V-PCC content correspond to one or more 3D spatial regions of the point cloud. |
| vpcc:@numLayers | O | xs:unsignedByte | The number of layers for the V-PCC stream. If @numLayers is not present, the default value is 1. |
| vpcc:@numTileGroups | O | xs:unsignedByte | Number of V-PCC tile groups in the V-PCC content. If @numTileGroups is not present, the default value is 1. |

Legend:
For attributes: M = Mandatory, O = Optional, OD = Optional with Default Value, CM = Conditionally Mandatory.
For elements: <minOccurs> ... <maxOccurs> (N = unbounded)
Elements are bold; attributes are non-bold and preceded with an @.

The element and attributes of the VPCCSpatialRegion descriptor described above in Table 1 can also be part of the VPCC descriptor as specified in Table 3.

TABLE 3

Element and attributes for the VPCC descriptor

| Attributes for VPCC descriptor | Use | Data type | Description |
|---|---|---|---|
| vpcc:@pcId | CM | xs:string | An id for the point cloud. This attribute may be present if multiple versions of the same |

TABLE 3-continued

Element and attributes for the VPCC descriptor

| Attributes for VPCC descriptor | Use | Data type | Description |
| --- | --- | --- | --- |
| | | | point cloud are signalled in separate AdapatationSets. |
| vpcc:@numLayers | O | xs:unsignedByte | The number of layers for the V-PCC stream. If @numLayers is not present, the default value is 1. |
| vpcc:@numTileGroups | O | xs:unsignedByte | Number of V-PCC tile groups in the V-PCC content. If @numTileGroups is not present, the default value is 1. |
| vpcc:SpatialRegion | 0 . . . N | vpcc:spatialRegionType | An element whose attributes specify the spatial region for the point cloud and its associated V-PCC component track groups. This element may be present if the V-PCC content correspond to one or more 3D spatial regions of the point cloud. |

Legend:
For attributes: M = Mandatory, O = Optional, OD = Optional with Default Value, CM = Conditionally Mandatory.
For elements: <minOccurs> . . . <maxOccurs> (N = unbounded)
Elements are bold; attributes are non-bold and preceded with an @.

The usage of VPCCSpatialRegion descriptor, VPCC descriptor and related preselection mechanisms using PreSelections element to support the partial access and delivery of point cloud content in MPEG-DASH is described as follows:

The VPCCSpatialRegion descriptor at the adaptation set level in the main AdaptationSet for the point cloud content indicates that the V-PCC track carried in the main AdaptationSet and associated V-PCC component tracks carried in their respective component AdaptationSets correspond to one or more static 3D spatial regions of a point cloud object.

The spatialRegion element of the VPCCSpatialRegion descriptor provides information of a spatial region of the point cloud, including the x, y, z offset of the spatial region and the width, height, and depth of the spatial region in 3D space, and optionally the 3D bounding box information of the point cloud.

Multiple versions of the same point cloud could be signaled using separate PreSelections. PreSelections that represent alternative versions of the same 3D spatial regions of the point cloud may contain a VPCC descriptor with the same @pcId value and the same @regionIds value, wherein the value assigned to the @pcId attribute identifies the point cloud content, and the value of @regionIds attribute identifies one or more 3D spatial regions of the point cloud. For example, as shown in the example MPD files in Embodiments 3 and 5, the values assigned to the @pcId attributes of the two preselections can be identical, indicating that both preselections belong to the same point cloud content.

If the @trackGroups attribute is absent in the VPCCSpatialRegion descriptor, a PreSelection element with an ID list for the @preselectionComponents attribute may include the ID of the main AdaptationSet for the point cloud followed by the IDs of the AdaptationSets corresponding to the point cloud components is used to signal the grouping V-PCC components belonging to the 3D spatial region in a point cloud.

If the @trackGroups attribute containing the values of the track_group_id for a number of V-PCC component track groups is present in the VPCCSpatialRegions descriptor, a PreSelection element with an ID list for the @preselectionComponents attribute may include the ID of the main AdaptationSet for the point cloud followed by the IDs of the ContentComponents corresponding to the point cloud components is used to signal the grouping V-PCC components belonging to the 3D spatial region in a point cloud.

In some embodiments, point cloud components may be delivered in a single Representation of respective component AdaptationSets and described by ContentComponent elements, e.g., occupancy map, geometry and attribute component AdaptationSets may contain multiple V-PCC component tracks of the same component type and each V-PCC component track is mapped to a ContentComponent. Thus, the group of V-PCC component tracks (have the same track_group_id value as the @trackGroups attribute) that correspond to a 3D spatial region for the point cloud can be mapped to ContentComponent elements from different component AdaptationSets.

Embodiments 3 to 5 further describe techniques for grouping V-PCC components belonging to the 3D spatial region of a point cloud content as described in Embodiment 2 for usage of VPCCSpatialRegion descriptor and related preselection mechanisms.

VII. Embodiment 3

Preselection of V-PCC Spatial Region

FIG. 1 illustrates an exemplary MPEG-DASH configuration for grouping V-PCC components belonging to the 3D spatial region of a point cloud content using component adaptation sets. In this embodiment, the V-PCC sequence comprises of the video-coded components of occupancy, geometry, and attribute and V-PCC component of atlas.

Each of video-coded occupancy, geometry, and attribute components is signaled by a separate AdaptationSet. Each component AdaptationSet of the occupancy, geometry, and attribute components includes a VPCCComponent descriptor with the @component_type attribute set to the corresponding value.

The V-PCC track which includes the atlas sub-bitstream is signaled by the main AdaptationSet with a single representation. Since the V-PCC track carried in the main AdaptationSet and associated V-PCC component tracks carried in their respective component AdaptationSets correspond to 3D spatial region "1" and region "2" in a point cloud object. The main AdaptationSet have two VPCCSpatialRegion descriptors with the @regionId attribute set to the identifier of 3D spatial regions respectively. Other attributes e.g., @reference_x, @reference_y, @reference_z and @delta_x, @delta_y, @delta_z of the VPCCSpatialRegion descriptor provide the spatial region information of the 3D spatial region, including the x, y, z coordinate offset and the width, height, and depth of the 3D spatial region corresponding to the 3D spatial part of point cloud data in the Cartesian coordinates.

V-PCC components belonging to 3D spatial region "1" and region "2" of the point cloud are grouped separately using two PreSelection elements in the MPD. The @preselectionComponents attribute of PreSelection element for the spatial region "1" preselection includes an id list as "1 2 4 6". The @preselectionComponents attribute of PreSelection element for the spatial region "2" preselection includes an id list "1 3 5 7". The ID 1 in the preselection corresponds to an identifier of the main adaptation set for the point cloud data and the IDs 2, 4, 6 and 3, 5, 7 correspond to the identifiers of the adaptations sets corresponding to the point cloud components.

Besides the mandatory @pcId attribute used to identify the point cloud, the VPCC descriptor of each PreSelection element shall also contain the @regionIds attribute to describe the 3D spatial region of the point cloud, i.e., regions "1" and "2" respectively.

To indicate that these V-PCC adaptation sets are referenced in at least one preselection, a preselection descriptor without @value attribute is signaled in each AdaptationSet.

An example MPD file that signals the preselection of V-PCC spatial region in this embodiment is described below.

```
<MPD>
< Period >
    <!-- Main V-PCC AdaptationSet -->
    <AdaptationSet id="1" codecs="vpc1">
        <EssentialProperty schemeIdUri="urn:mpeg:dash:preselection:2016"/>
            <SupplementalProperty schemeIdUri="urn:mpeg:mpegI:vpcc:2019:vpsr">
                <vpcc:spatialRegion regionId="1" reference_x="0" reference_y="0"
                    reference_z="0" delta_x="10" delta_y="10" delta_z="10" />
                <vpcc:spatialRegion regionId="2" reference_x="10" reference_y="10"
                    reference_z="10" delta_x="20" delta_y="20" delta_z="20" />
            </SupplementalProperty >
        ...
    </AdaptationSet>
    <!-- Occupancy Map -->
    <AdaptationSet id="2" mimeType="video/mp4" codecs="resv.pccv.hvc1">
        <EssentialProperty schemeIdUri="urn:mpeg:dash:preselection:2016" />
        <EssentialProperty schemeIdUri="urn:mpeg:mpegI:vpcc:2019:component">
            <vpcc:component component_type="occp" />
        </EssentialProperty >
        <Representation >
        ...
        </Representation>
    </AdaptationSet>
    <AdaptationSet id="3" mimeType="video/mp4" codecs="resv.pccv.hvc1">
        <EssentialProperty schemeIdUri="urn:mpeg:dash:preselection:2016" />
        <EssentialProperty schemeIdUri="urn:mpeg:mpegI:vpcc:2019:component">
            <vpcc:component component_type="occp" />
        </EssentialProperty >
        <Representation >
        ...
        </Representation>
    </AdaptationSet>
    <!-- Geometry -->
    <AdaptationSet id="4" mimeType="video/mp4" codecs="resv.pccv.hvc1">
        <EssentialProperty schemeIdUri="urn:mpeg:dash:preselection:2016" />
        <EssentialProperty schemeIdUri="urn:mpeg:mpegI:vpcc:2019:component">
            <vpcc:component component_type="geom" />
        </EssentialProperty >
        <Representation >
        ...
        </Representation>
        <Representation >
        ...
        </Representation>
    </AdaptationSet>
    <AdaptationSet id="5" mimeType="video/mp4" codecs="resv.pccv.hvc1">
        <EssentialProperty schemeIdUri="urn:mpeg:dash:preselection:2016" />
        <EssentialProperty schemeIdUri="urn:mpeg:mpegI:vpcc:2019:component">
            <vpcc:component component_type="geom" />
        </EssentialProperty >
        <Representation >
        ...
        </Representation>
        <Representation >
        ...
        </Representation>
    </AdaptationSet>
    <!-- Attribute -- >
```

```xml
    <AdaptationSet id="6" mimeType="video/mp4" codecs="resv.pccv.hvc1">
      <EssentialProperty schemeIdUri="urn:mpeg:dash:preselection:2016" />
      <EssentialProperty schemeIdUri="urn:mpeg:mpegI:vpcc:2019:component">
        <vpcc:component component_type="attr" />
      </EssentialProperty >
      <Representation >
      ...
      </Representation>
    </AdaptationSet>
    <AdaptationSet id="7" mimeType="video/mp4" codecs="resv.pccv.hvc1">
      <EssentialProperty schemeIdUri="urn:mpeg:dash:preselection:2016" />
      <EssentialProperty schemeIdUri="urn:mpeg:mpegI:vpcc:2019:component">
        <vpcc:component component_type="attr" />
      </EssentialProperty >
      <Representation >
      ...
      </Representation>
    </AdaptationSet>
    <!-- Preselections -->
    <Preselection id="1" tag="1" preselectionComponents="1 2 4 6" codecs="vpc1">
      <!-- VPCC Descriptor -->
      <EssentialProperty schemeIdUri="urn:mpeg:mpegI:vpcc:2019:vpc" pcId="1"
         regionIds="1" numLayers="2" numTileGroups="1" />
    </Preselection>
    <Preselection id="2" tag="2" preselectionComponents="1 3 5 7" codecs="vpc1">
      <!-- VPCC Descriptor -->
      <EssentialProperty schemeIdUri="urn:mpeg:mpegI:vpcc:2019:vpc" pcId="1"
         regionIds="2" numLayers="2" numTileGroups="1" />
    </Preselection>
  </Period>
</MPD>
```

VIII. Embodiment 4

Preselection of V-PCC Spatial Region using V-PCC components AdaptationSets

Figure 2:
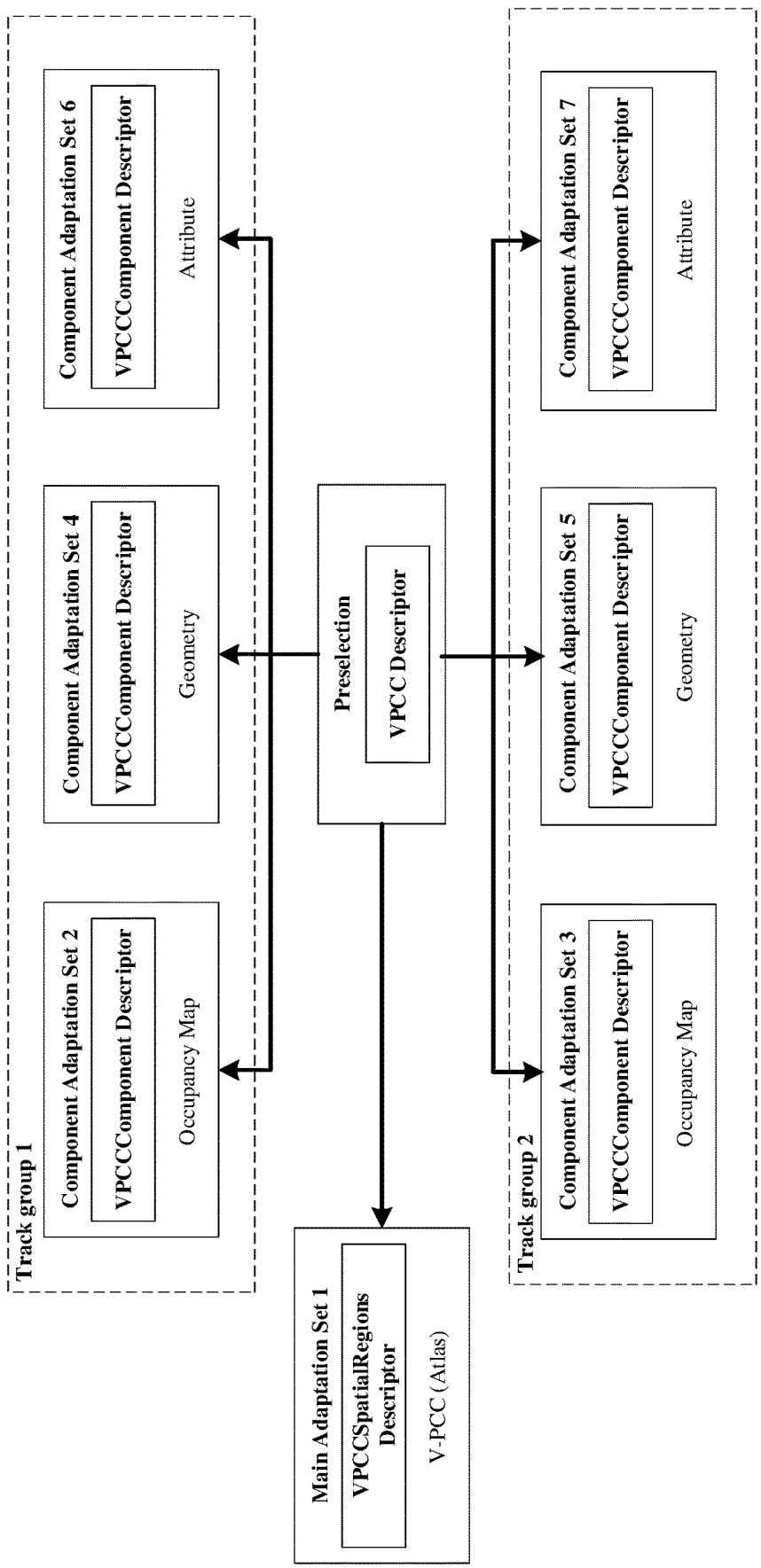
FIG. 2 illustrates an exemplary MPEG-DASH configuration for the preselection of V-PCC components belonging to the 3D spatial region of a point cloud content.

FIG. 2 illustrates an exemplary MPEG-DASH configuration for the preselection of V-PCC components belonging to the 3D spatial region of a point cloud content.

In this embodiment, the V-PCC sequence comprises of the video-coded components of occupancy, geometry, and attribute and V-PCC component of atlas.

Each of video-coded occupancy, geometry, and attribute components can be signaled by a separate AdaptationSet. Each component AdaptationSet of the occupancy, geometry, and attribute components includes a VPCCComponent descriptor with the @component_type attribute set to the corresponding value.

The V-PCC track which includes the atlas sub-bitstream is signaled by the main AdaptationSet with a single representation. Since the V-PCC track carried in the main AdaptationSet and associated V-PCC component tracks carried in their respective component AdaptationSets correspond to the 3D spatial region "1" in a point cloud object. The main AdaptationSet have a VPCCSpatialRegion descriptor with the @regionId attribute set to the identifier of the 3D spatial region of a point cloud content. Other attributes, such as @reference_x, @reference_y, @reference_z and @delta_x, @delta_y, @delta_z of the VPCCSpatialRegion descriptor provide the spatial region information of the 3D spatial region, including the x, y, z coordinate offset and the width, height, and depth of the 3D spatial region corresponding to the 3D spatial part of point cloud data in the Cartesian coordinates.

In this embodiment, the @trackGroups attribute containing the values of the track_group_id is absent in the VPCCSpatialRegion descriptor although the V-PCC component tracks corresponding to the 3D spatial region "1" belong to track group "1" and track group "2". The V-PCC occupancy, geometry and attribute component tracks of track group "1" are carried in the component AdaptationSets 2, 4 and 6, respectively. The V-PCC occupancy, geometry and attribute component tracks of track group "2" are carried in the component AdaptationSets 3, 5 and 7, respectively.

V-PCC components belonging to the spatial region "1" of the point cloud are grouped together using one PreSelection elements in the MPD. The @preselectionComponents attribute of the PreSelection element for the spatial region "1" preselection includes an ID list as "1 2 3 4 5 6 7". The ID 1 in the preselection corresponds to an identifier of the main adaptation set for the point cloud data and the IDs 2 to 7 correspond to the identifiers of the point cloud components. The PreSelection element may include a VPCC descriptor that contains the mandatory @pcId attribute to indicate the point cloud content and the @regionIds attribute to identify the 3D spatial region "1" of the point cloud. To indicate that these V-PCC adaptation sets are referenced in at least one preselection, a preselection descriptor without @value attribute is signaled in each AdaptationSet.

An example MPD file that signals the preselection of V-PCC spatial region using V-PCC components AdaptationSets in this embodiment is described below.

```xml
<MPD>
  < Period >
    <!-- Main V-PCC AdaptationSet -->
    <AdaptationSet id="1" codecs="vpc1">
      <EssentialProperty schemeIdUri="urn:mpeg:dash:preselection:2016"/>
      <SupplementalProperty schemeIdUri="urn:mpeg:mpegI:vpcc:2019:vpsr">
```

-continued

```
        <vpcc:spatialRegion regionId="1" reference_x="0" reference_y="0" reference_z="0"
            delta_x="20" delta_y="20" delta_z="20" />
      </SupplementalProperty >
      <Representation >
      ...
      </Representation>
    </AdaptationSet>
    <!-- Occupancy Map -->
    <AdaptationSet id="2" mimeType="video/mp4" codecs="resv.pccv.hvc1">
      <EssentialProperty schemeIdUri="urn:mpeg:dash:preselection:2016" />
      <EssentialProperty schemeIdUri="urn:mpeg:mpegI:vpcc:2019:component">
        <vpcc:component component_type="occp" />
      </EssentialProperty >
      <Representation >
      ...
      </Representation>
    </AdaptationSet>
    <AdaptationSet id="3" mimeType="video/mp4" codecs="resv.pccv.hvc1">
      <EssentialProperty schemeIdUri="urn:mpeg:dash:preselection:2016" />
      <EssentialProperty schemeIdUri="urn:mpeg:mpegI:vpcc:2019:component">
        <vpcc:component component_type="occp" />
      </EssentialProperty >
      <Representation >
      ...
      </Representation>
    </AdaptationSet>
    <!-- Geometry -->
    <AdaptationSet id="4" mimeType="video/mp4" codecs="resv.pccv.hvc1">
      <EssentialProperty schemeIdUri="urn:mpeg:dash:preselection:2016" />
      <EssentialProperty schemeIdUri="urn:mpeg:mpegI:vpcc:2019:component">
        <vpcc:component component_type="geom" />
      </EssentialProperty >
      <Representation >
      ...
      </Representation>
      <Representation >
      ...
      </Representation>
    </AdaptationSet>
    <AdaptationSet id="5" mimeType="video/mp4" codecs="resv.pccv.hvc1">
      <EssentialProperty schemeIdUri="urn:mpeg:dash:preselection:2016" />
      <EssentialProperty schemeIdUri="urn:mpeg:mpegI:vpcc:2019:component">
        <vpcc:component component_type="geom" />
      </EssentialProperty >
      <Representation >
      ...
      </Representation>
      <Representation >
      ...
      </Representation>
    </AdaptationSet>
    <!-- Attribute -->
    <AdaptationSet id="6" mimeType="video/mp4" codecs="resv.pccv.hvc1">
      <EssentialProperty schemeIdUri="urn:mpeg:dash:preselection:2016" />
      <EssentialProperty schemeIdUri="urn:mpeg:mpegI:vpcc:2019:component">
        <vpcc:component component_type="attr" />
      </EssentialProperty >
      <Representation >
      ...
      </Representation>
    </AdaptationSet>
    <AdaptationSet id="7" mimeType="video/mp4" codecs="resv.pccv.hvc1">
      <EssentialProperty schemeIdUri="urn:mpeg:dash:preselection:2016" />
      <EssentialProperty schemeIdUri="urn:mpeg:mpegI:vpcc:2019:component">
        <vpcc:component component_type="attr" />
      </EssentialProperty >
      <Representation >
      ...
      </Representation>
    </AdaptationSet>
    <!-- Preselections -->
    <Preselection id="1" tag="1" preselectionComponents="1 2 3 4 5 6 7" codecs="vpc1">
      <!-- VPCC Descriptor -->
      <EssentialProperty schemeIdUri="urn:mpeg:mpegI:vpcc:2019:vpc" pcId="1"
        regionIds="1" numLayers="2" numTileGroups="1" />
    </Preselection>
  </Period>
</MPD>
```

IX. Embodiment 5

Preselection of V-PCC Spatial Region using ContentComponent

Figure 3:
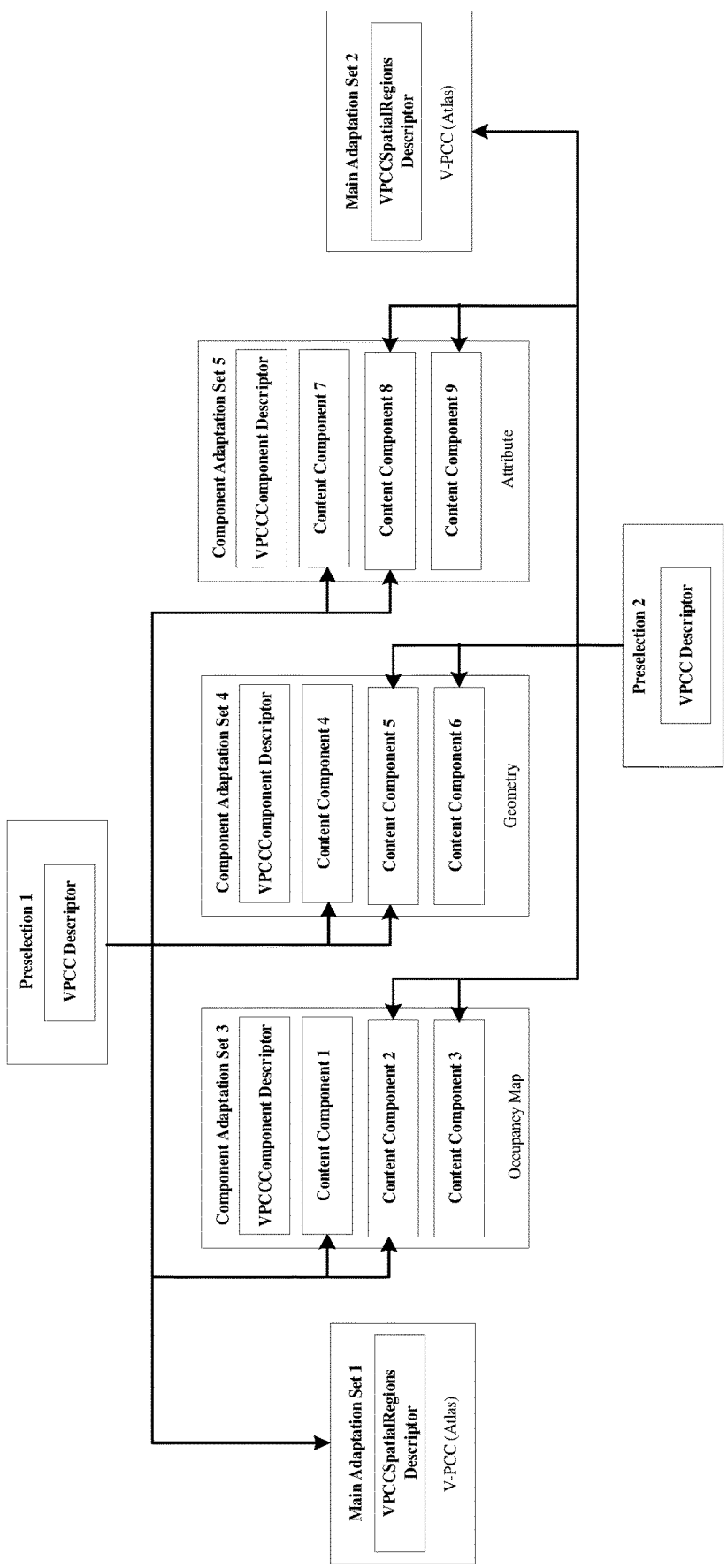
FIG. 3 illustrates an exemplary MPEG-DASH configuration for the preselection of V-PCC components belonging to two 3D spatial regions of the point cloud.

FIG. 3 illustrates an exemplary MPEG-DASH configuration for the preselection of V-PCC components belonging to two 3D spatial regions of the point cloud, which could be mapped to three V-PCC component track groups using content components. In this embodiment, the V-PCC sequence comprises of the video-coded components of occupancy, geometry, and attribute and V-PCC component of atlas.

Each of video-coded occupancy, geometry, and attribute components can be signaled by a separate AdaptationSet. Each component AdaptationSet of the occupancy, geometry, and attribute components includes a VPCCComponent descriptor with the @component_type attribute set to the corresponding value.

In this example, the V-PCC track which includes the atlas sub-bitstream is signaled by two main AdaptationSets. Each main AdaptationSet has a VPCCSpatialRegion descriptor with the @regionId attribute set to the indentifier of the 3D spatial region of the point cloud, i.e. "1" and "2" respectively. The VPCCSpatialRegion descriptor in each main AdaptationSet also has the @trackGroupIDs attribute to identify V-PCC component track groups that correspond to the 3D spatial region of the point cloud. For this example, 3D spatial region "1" is mapped to V-PCC component track groups with the track_group_id of "1 2", and 3D spatial region "2" is mapped to V-PCC component track groups with the track_group_id of "2 3".

For this example, the V-PCC occupancy map component tracks are carried in the component AdaptationSets 3 and described by ContentComponent elements "1 2 3". The V-PCC geometry component tracks are carried in the component AdaptationSets 4 and described by ContentComponent elements "4 5 6". The V-PCC attribute component tracks are carried in the component AdaptationSets 5 and described by ContentComponent elements "7 8 9".

The V-PCC component tracks groups with the track_group_id attribute value "1", "2" and "3" will be mapped to ContentComponent elements with the id attribute value "1 4 7", "2 5 8" and "3 6 9" respectively.

V-PCC components belonging to 3D spatial region "1" and region "2" of the point cloud are grouped separately using two PreSelection elements in the MPD. The @preselectionComponents attribute of PreSelection element for the spatial region "1" preselection includes an id list as "1 2 4 6". The @preselectionComponents attribute of PreSelection element for the spatial region "2" preselection includes an id list "1 3 5 7".

V-PCC components belonging to 3D spatial region "1" and region "2" of the point cloud are grouped separately using two PreSelection elements in the MPD. The @preselectionComponents attribute of PreSelection element for the spatial region "1" (which is mapped to track group "1 2") preselection includes an id list as "1 1 2 4 5 7 8" and the @preselectionComponents attribute of PreSelection element for the spatial region "2" (which is mapped to track group "2 3") preselection includes an id list as "1 2 3 5 6 8 9". The ID 1 in the preselection corresponds to an identifier of the main adaptation set for the point cloud data and the IDs 1, 2, 4, 5, 7, and 8 correspond to the identifiers of the content components.

Besides the mandatory @pcId attribute used to identify the point cloud, the VPCC descriptor of each PreSelection element shall also contain the @regionIds attribute to describe the 3D spatial region of the point cloud, i.e., regions "1" and "2" respectively.

To indicate that these V-PCC adaptation sets are referenced in at least one preselection, a preselection descriptor without @value attribute is signaled in each AdaptationSet.

An example MPD file that signals the preselection of V-PCC spatial region using ContentComponent in this embodiment is described below.

```
<MPD>
< Period >
    <!-- Main V-PCC AdaptationSet -->
    <AdaptationSet id="1" codecs="vpc1" >
        <EssentialProperty schemeIdUri="urn:mpeg:dash:preselection:2016"/>
        <SupplementalProperty schemeIdUri="urn:mpeg:mpegI:vpcc:2019:vpsr">
            <vpcc:spatialRegion regionId="1" reference_x="0" reference_y="0" reference_z="0"
                delta_x="20" delta_y="20" delta_z="20" trackGroupIds="1 2"/>
        </SupplementalProperty>
        < Representation >
        ...
        </Representation>
    </AdaptationSet>
    <!-- Main V-PCC AdaptationSet -->
    <AdaptationSet id="1" codecs="vpc1" >
        <EssentialProperty schemeIdUri="urn:mpeg:dash:preselection:2016"/>
        <SupplementalProperty schemeIdUri="urn:mpeg:mpegI:vpcc:2019:vpsr">
            <vpcc:spatialRegion regionId="2" reference_x="10" reference_y="10"
                reference_z="10" delta_x="30" delta_y="30" delta_z="30" trackGroupIds="2 3"/>
        </SupplementalProperty>
        < Representation >
        ...
        </Representation>
    </AdaptationSet>
    <!-- Occupancy Map -->
    <AdaptationSet id="2" mimeType="video/mp4" codecs="resv.pccv.hvc1">
        <EssentialProperty schemeIdUri="urn:mpeg:dash:preselection:2016" />
        <EssentialProperty schemeIdUri="urn:mpeg:mpegI:vpcc:2019:component">
            <vpcc:component component_type="occp" />
        </EssentialProperty >
        < Representation >
        ...
        </Representation>
    </AdaptationSet>
```

```xml
<AdaptationSet id="3" mimeType="video/mp4" codecs="resv.pccv.hvc1">
  <EssentialProperty schemeIdUri="urn:mpeg:dash:preselection:2016" />
  <EssentialProperty schemeIdUri="urn:mpeg:mpegI:vpcc:2019:component">
    <vpcc:component component_type="occp" />
  </EssentialProperty >
  < Representation >
  ...
  </Representation>
</AdaptationSet>
<!-- Geometry -->
<AdaptationSet id="4" mimeType="video/mp4" codecs="resv.pccv.hvc1">
  <EssentialProperty schemeIdUri="urn:mpeg:dash:preselection:2016" />
  <EssentialProperty schemeIdUri="urn:mpeg:mpegI:vpcc:2019:component">
    <vpcc:component component_type="geom" />
  </EssentialProperty >
  < Representation >
  ...
  </Representation>
  < Representation >
  ...
  </Representation>
</AdaptationSet>
<AdaptationSet id="5" mimeType="video/mp4" codecs="resv.pccv.hvc1">
  <EssentialProperty schemeIdUri="urn:mpeg:dash:preselection:2016" />
  <EssentialProperty schemeIdUri="urn:mpeg:mpegI:vpcc:2019:component">
    <vpcc:component component_type="geom" />
  </EssentialProperty >
  < Representation >
  ...
  </Representation>
  < Representation >
  ...
  </Representation>
</AdaptationSet>
<!-- Attribute -->
<AdaptationSet id="6" mimeType="video/mp4" codecs="resv.pccv.hvc1">
  <EssentialProperty schemeIdUri="urn:mpeg:dash:preselection:2016" />
  <EssentialProperty schemeIdUri="urn:mpeg:mpegI:vpcc:2019:component">
    <vpcc:component component_type="attr" />
  </EssentialProperty >
  < Representation >
  ...
  </Representation>
</AdaptationSet>
<AdaptationSet id="7" mimeType="video/mp4" codecs="resv.pccv.hvc1">
  <EssentialProperty schemeIdUri="urn:mpeg:dash:preselection:2016" />
  <EssentialProperty schemeIdUri="urn:mpeg:mpegI:vpcc:2019:component">
    <vpcc:component component_type="attr" />
  </EssentialProperty >
  < Representation >
  ...
  </Representation>
</AdaptationSet>
<!-- Preselections -->
<Preselection id="1" tag="1" preselectionComponents="1 2 4 5 7 8" codecs="vpc1">
  <!-- VPCC Descriptor -->
  <EssentialProperty schemeIdUri="urn:mpeg:mpegI:vpcc:2019:vpc" pcId="1"
    regionIds="1" numLayers="2" numTileGroups="1" />
</Preselection>
<Preselection id="2" tag="2" preselectionComponents="1 2 3 5 6 8 9" codecs="vpc1">
  <!-- VPCC Descriptor -->
  <EssentialProperty schemeIdUri="urn:mpeg:mpegI:vpcc:2019:vpc" pcId="1"
    regionIds="2" numLayers="2" numTileGroups="1" />
</Preselection>
  </Period>
</MPD>
```

When the 3D partitions are dynamic, a timed-metadata track for signaling the position and dimensions of each 3D region in the presentation timeline may be carried in a separate AdaptationSet with a single representation and associated with the main V-PCC track using an @associationId attribute, defined in MPEG-DASH, with a @associationType value that includes the 4CC 'vpcm' for the corresponding AdaptationSet or Representation.

Figure 4A:
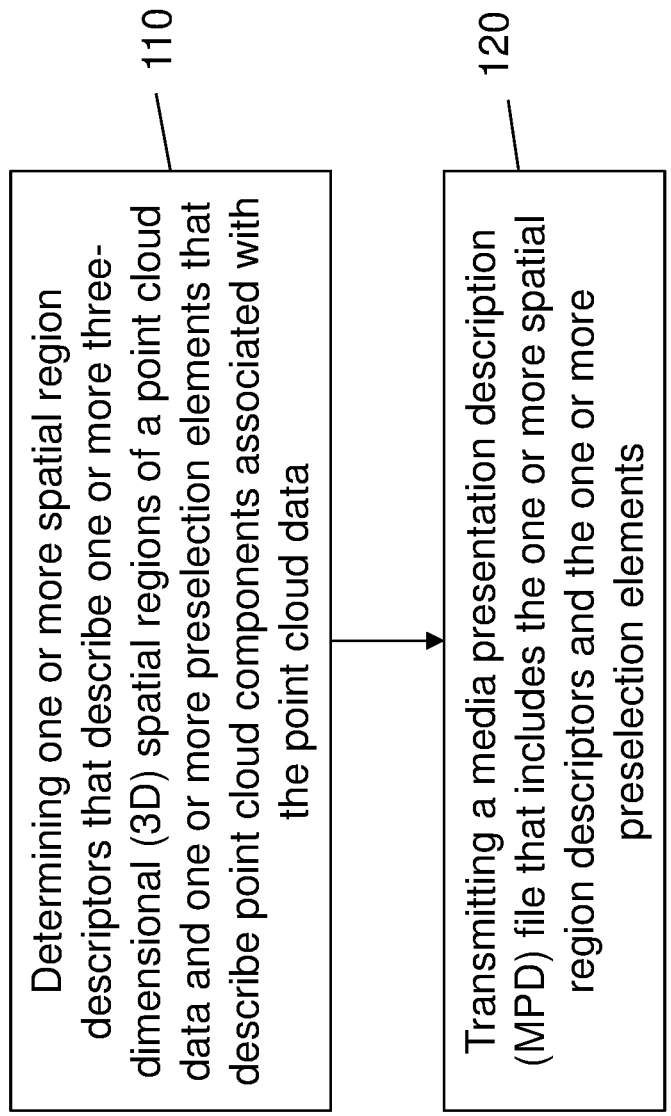
FIG. 4A is a flowchart of an example method of point cloud data processing and transmission.

FIG. 4A is a flowchart of an example method of point cloud data processing and transmission. Operation 110 includes determining one or more spatial region descriptors that describe one or more three-dimensional (3D) spatial regions of a point cloud data and one or more preselection elements that describe point cloud components associated with the point cloud data. Operation 120 includes transmitting a media presentation description (MPD) file that includes the one or more spatial region descriptors and the one or more preselection elements.

Figure 4B:
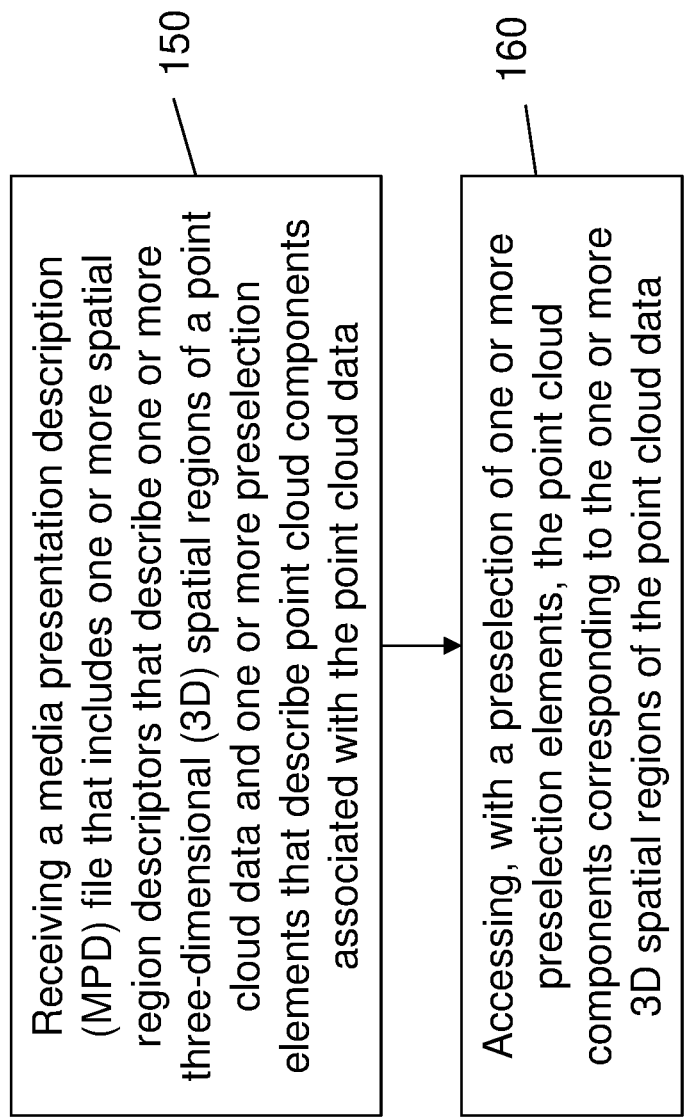
FIG. 4B is a flowchart of an example method of point cloud data reception and processing.

FIG. 4B is a flowchart of an example method of point cloud data reception and processing. Operation 150 includes receiving a media presentation description (MPD) file that includes one or more spatial region descriptors that describe one or more three-dimensional (3D) spatial regions of a point cloud data and one or more preselection elements that describe point cloud components associated with the point cloud data. Operation 160 includes accessing, with a preselection of one or more preselection elements, the point cloud components corresponding to the one or more 3D spatial regions of the point cloud data. In some embodiments, the accessing of operation 160 may include parsing of a preselection element of the one or more preselection elements to access the point cloud components corresponding to the one or more 3D spatial regions of the point cloud data.

The following described features can be applicable to the methods described in FIGS. 4A, 4B and in the various embodiments described in this patent document.

In some embodiments, the one or more spatial region descriptors are included in a main adaptation set for the point cloud data in the MPD file. In some embodiments, each of the one or more spatial region descriptors includes offset values and dimensions of the one or more 3D spatial regions. In some embodiments, each of the one or more spatial region descriptors includes 3D bounding box information of the point cloud data. In some embodiments, the one or more preselection elements are associated with one or more encoded versions of the point cloud data, and each of the one or more preselection elements includes a first value that identifies the point cloud data and a second value that identifies the one or more 3D spatial regions. In some embodiments, each of the one or more preselection elements includes a point cloud descriptor element that includes the first value and the second value.

In some embodiments, each of the one or more preselection elements includes: an identifier of a main adaptation set for the point cloud data, and a plurality of identifiers of adaptation sets corresponding to the point cloud components. In some embodiments, a point cloud component track group identifier attribute is absent in the one or more spatial region descriptors. In some embodiments, each of the one or more preselection elements includes: an identifier of a main adaptation set for the point cloud data, and a plurality of identifiers of content components corresponding to point cloud components. In some embodiments, a point cloud component track group identifier is present in the one or more spatial region descriptors.

In some embodiments, each of the one or more preselection elements includes a preselection component attribute that includes the identifier and the plurality of identifiers. In some embodiments, a point cloud component track group identifier attribute in the one or more spatial region descriptors corresponds to one 3D spatial region that is mapped to content components from different adaptation sets. In some embodiments, the point cloud components include an atlas data, an occupancy map component, a geometric component, or an attribute component. In some embodiments, the point cloud components correspond to the one or more 3D spatial regions of the point cloud data.

Figure 5:
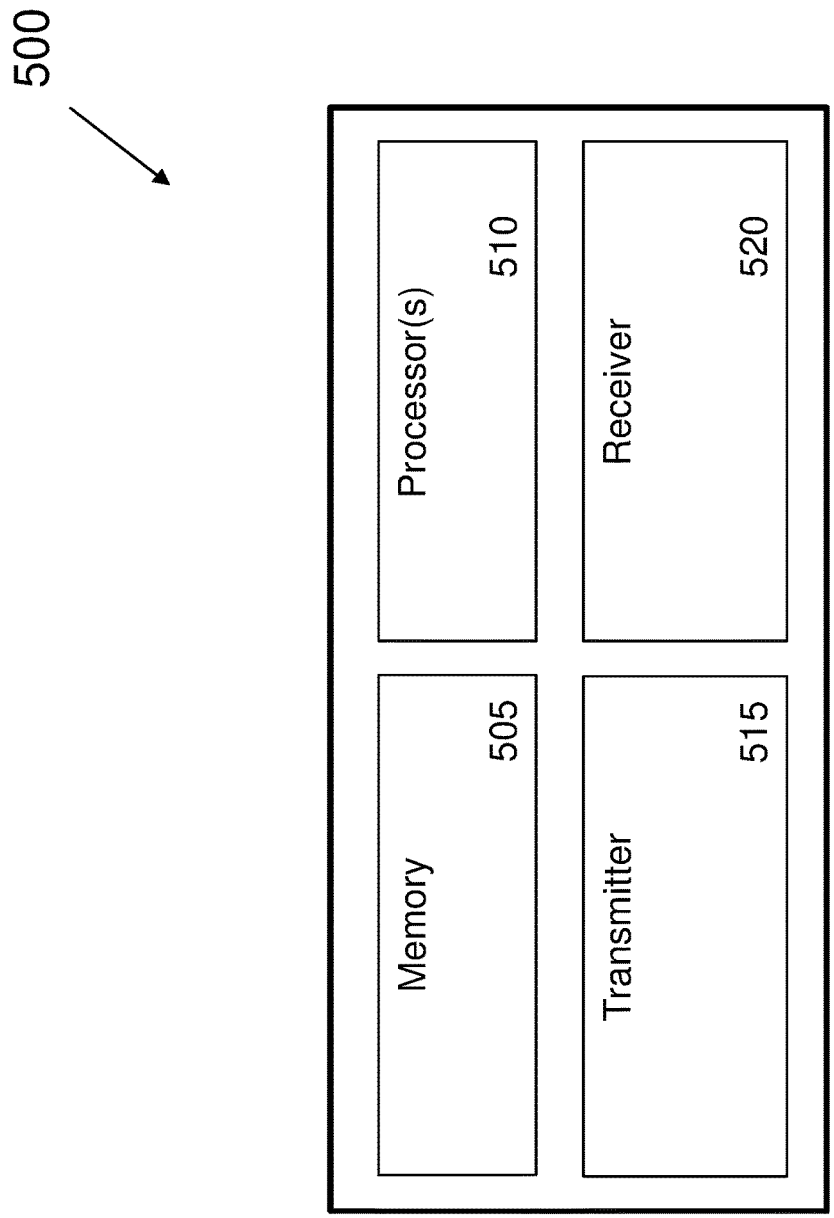
FIG. 5 shows an exemplary block diagram of a hardware platform 500 that may be a part of a video encoder or video decoder.

FIG. 5 shows an exemplary block diagram of a hardware platform 500 that may be a part of a video encoder or video decoder. The hardware platform 500 includes at least one processor 510 and a memory 505 having instructions stored thereupon. The instructions upon execution by the processor 510 configure the hardware platform 500 to perform the operations described in or for FIGS. 1 to 4B and in the various embodiments described in this patent document. The transmitter 515 transmits or sends information or data to another device. For example, a video encoder transmitter in a server can send encoded video to a video decoder in another device (e.g., mobile device). The receiver 520 receives information or data transmitted or sent by another device. For example, a mobile device video decoder can receive encoded video data from another device (e.g., server).

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of point cloud data processing, comprising:
   determining one or more spatial region descriptors that describe one or more three-dimensional (3D) spatial regions of a point cloud data and one or more preselection elements that describe point cloud components associated with the point cloud data; and
   transmitting a media presentation description (MPD) file that includes the one or more spatial region descriptors and the one or more preselection elements,
      wherein each of the one or more spatial region descriptors includes offset values and dimensions of the one or more 3D spatial regions, and
      wherein each of the one or more preselection elements includes:
         an identifier of a main adaptation set for the point cloud data, and
         a plurality of identifiers of adaptation sets corresponding to the point cloud components.

2. The method of claim 1, wherein the one or more spatial region descriptors are included in the main adaptation set for the point cloud data in the MPD file.

3. The method of claim 1, wherein each of the one or more spatial region descriptors includes 3D bounding box information of the point cloud data.

4. The method of claim 1,
   wherein the one or more preselection elements are associated with one or more encoded versions of the point cloud data, and
   wherein each of the one or more preselection elements includes a first value that identifies the point cloud data and a second value that identifies the one or more 3D spatial regions.

5. The method of claim 4, wherein each of the one or more preselection elements includes a point cloud descriptor element that includes the first value and the second value.

6. The method of claim 1, wherein each of the one or more preselection elements includes a preselection component attribute that includes the identifier and the plurality of identifiers.

7. The method of claim 1, wherein the point cloud components include an atlas data, an occupancy map component, a geometric component, or an attribute component.

8. The method of claim 1, wherein the point cloud components correspond to the one or more 3D spatial regions of the point cloud data.

9. A method of point cloud data processing, comprising:
   receiving a media presentation description (MPD) file that includes one or more spatial region descriptors that describe one or more three-dimensional (3D) spatial regions of a point cloud data and one or more preselection elements that describe point cloud components associated with the point cloud data; and
   accessing, with a preselection of one or more preselection elements, the point cloud components corresponding to the one or more 3D spatial regions of the point cloud data,
      wherein each of the one or more spatial region descriptors includes offset values and dimensions of the one or more 3D spatial regions, and
      wherein each of the one or more preselection elements includes:
         an identifier of a main adaptation set for the point cloud data, and
         a plurality of identifiers of adaptation sets corresponding to the point cloud components.

10. The method of claim 9, wherein the one or more spatial region descriptors are included in the main adaptation set for the point cloud data in the MPD file.

11. The method of claim 9, wherein each of the one or more spatial region descriptors includes 3D bounding box information of the point cloud data.

12. The method of claim 9,
   wherein the one or more preselection elements are associated with one or more encoded versions of the point cloud data, and
   wherein each of the one or more preselection elements includes a first value that identifies the point cloud data and a second value that identifies the one or more 3D spatial regions.

13. The method of claim 12, wherein each of the one or more preselection elements includes a point cloud descriptor element that includes the first value and the second value.

14. The method of claim 9, wherein each of the one or more preselection elements includes a preselection component attribute that includes the identifier and the plurality of identifiers.

15. The method of claim 9, wherein the point cloud components include an atlas data, an occupancy map component, a geometric component, or an attribute component.

16. The method of claim 9, wherein the point cloud components correspond to the one or more 3D spatial regions of the point cloud data.

17. A video processing apparatus, comprising:
   a processor configured to implement a method, the processor configured to:
      determine one or more spatial region descriptors that describe one or more three-dimensional (3D) spatial regions of a point cloud data and one or more preselection elements that describe point cloud components associated with the point cloud data; and
      transmit a media presentation description (MPD) file that includes the one or more spatial region descriptors and the one or more preselection elements,
         wherein each of the one or more spatial region descriptors includes offset values and dimensions of the one or more 3D spatial regions, and
         wherein each of the one or more preselection elements includes:
            an identifier of a main adaptation set for the point cloud data, and
            a plurality of identifiers of adaptation sets corresponding to the point cloud components.

18. The video processing apparatus of claim 17, the one or more spatial region descriptors are included in the main adaptation set for the point cloud data in the MPD file.

19. A video processing apparatus, comprising:
   a processor configured to implement a method, the processor configured to:

receive a media presentation description (MPD) file that includes one or more spatial region descriptors that describe one or more three-dimensional (3D) spatial regions of a point cloud data and one or more preselection elements that describe point cloud components associated with the point cloud data; and access, with a preselection of one or more preselection elements, the point cloud components corresponding to the one or more 3D spatial regions of the point cloud data, wherein each of the one or more spatial region descriptors includes offset values and dimensions of the one or more 3D spatial regions, and wherein each of the one or more preselection elements includes:

an identifier of a main adaptation set for the point cloud data, and a plurality of identifiers of adaptation sets corresponding to the point cloud components.

20. The video processing apparatus of claim 19, the one or more spatial region descriptors are included in the main adaptation set for the point cloud data in the MPD file.

* * * * *